(12) United States Patent
Williamson

(10) Patent No.: US 6,550,861 B1
(45) Date of Patent: Apr. 22, 2003

(54) PASSENGER SEAT MEAL TRAY

(75) Inventor: John Williamson, Burlington, CT (US)

(73) Assignee: B E Aerospace, Inc., Wellington, FL (US)

(*) Notice: Subject to any disclaimer, the term of this patent is extended or adjusted under 35 U.S.C. 154(b) by 0 days.

(21) Appl. No.: 09/990,551

(22) Filed: Nov. 21, 2001

(51) Int. Cl.⁷ .............................................. A47C 15/00
(52) U.S. Cl. ........................ 297/232; 297/163; 297/173; 108/44; 292/204
(58) Field of Search ..................... 108/44; 297/163, 297/173, 232; 292/175, 202, 204, 242

(56) References Cited

U.S. PATENT DOCUMENTS

| 4,511,178 A | | 4/1985 | Brennan | |
| 4,726,621 A | * | 2/1988 | Muller | 297/146 |
| 5,169,209 A | | 12/1992 | Beroth | |
| 5,340,059 A | | 8/1994 | Kanigowski | |
| 5,547,247 A | | 8/1996 | Dixon | |
| 5,695,240 A | * | 12/1997 | Luria | 297/163 |
| 6,102,452 A | * | 8/2000 | Liau | 292/175 |

* cited by examiner

Primary Examiner—Peter M. Cuomo
Assistant Examiner—Erika Garrett
(74) Attorney, Agent, or Firm—Adams, Schwartz & Evans, P.A.

(57) ABSTRACT

A passenger seat meal tray latch assembly having a pair of laterally spaced-apart latch plates for being secured to a surface of a seat back of a passenger seat directly above a meal tray stowage position, a cross-member for being positioned laterally across the surface of the seat back and locked to the seat back by releasable connection to the pair of latch plates, a latch mounted on the cross-member and movable between a retracted position for permitting the meal tray to be moved into and out of its stowage position and an extended position for latching the meal tray to the seat back.

17 Claims, 16 Drawing Sheets

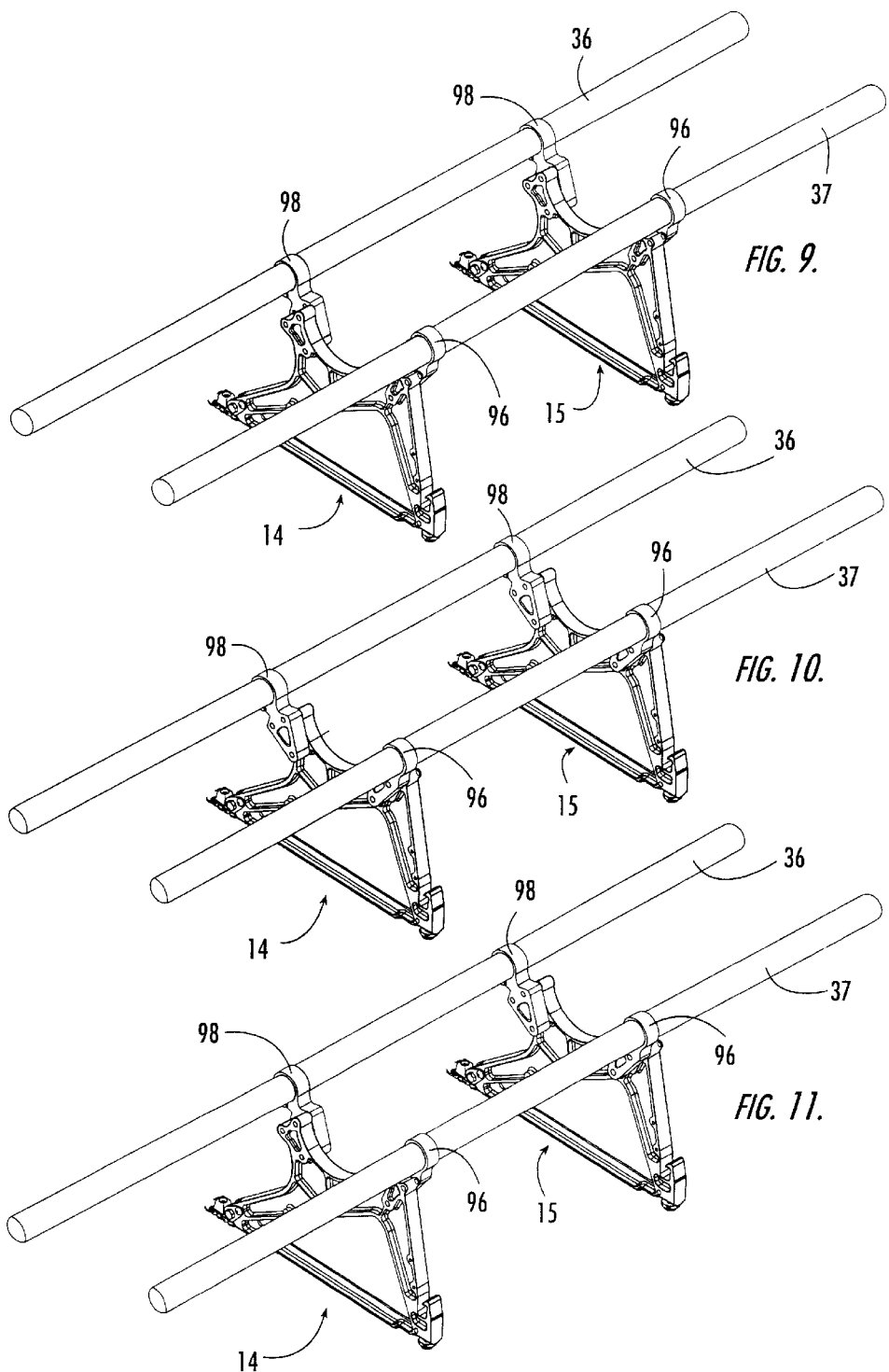

PASSENGER SEAT MEAL TRAY

TECHNICAL FIELD AND BACKGROUND OF THE INVENTION

Figure 1:
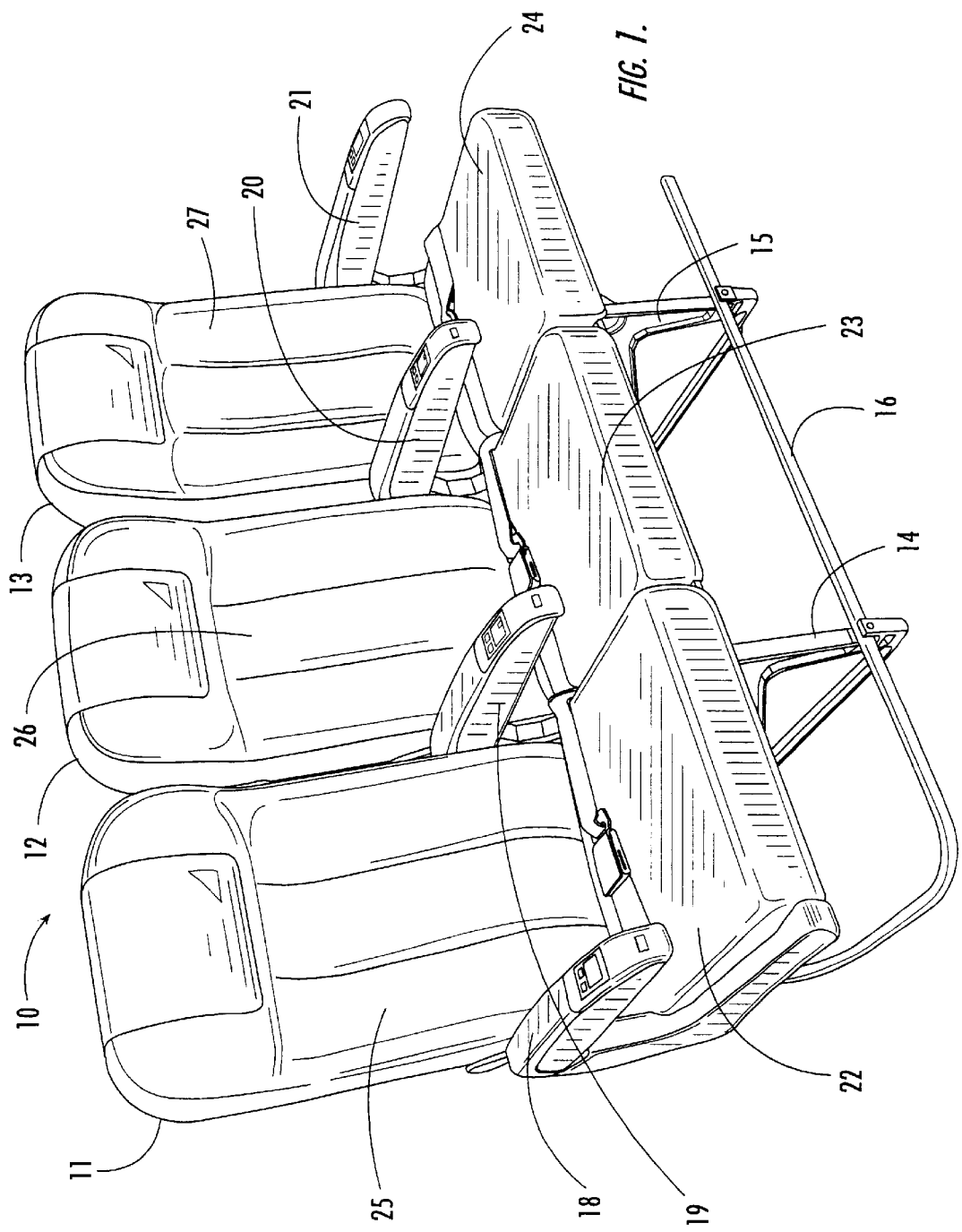

This invention relates to a passenger seat meal tray of the general type used on aircraft passenger seats. Such seats are fitted with meal trays which are fitted to the back of a seat for use by a passenger in a seat immediately aft of the seat on which the tray is fitted. The tray is mounted on legs which permit the tray to be positioned in a use position with tray in a horizontal position and in a stowed position with the tray flush against a rear surface of the seat back. The stowed position the tray is held in place by a rotating latch referred to as a "barndoor" latch, the center of which is housed in a latch plate. The latch plate is retained in the seat back frame with small semi-concealed screws. The seat back includes a cross-member that is designed to be a rigid support for the latch and forms a ledge that protects the top edge of the table in the event of a passenger impact from behind. The seat back is covered with a dress cover which is removable for cleaning purposes. In prior art designs, the ledge formed by the latch plate and the cross-member prevents efficient dress cover installation and removal by requiring removal of these components. Ideally, the dress cover should be able to be removed and replaced quickly and without tools.

The present invention provides a simple yet robust design which makes dress cover removal and replacement more efficient while still protecting the meal tray against damage from passenger impact.

SUMMARY OF THE INVENTION

Therefore, it is an object of the invention to provide a passenger seat meal tray, the latch portion of which is quickly and easily removable from the seat back.

It is another object of the invention to provide a passenger seat meal tray, the latch portion of which is removable from the seat back without tools.

It is another object of the invention to provide a passenger seat meal tray which presents a clean, uncluttered appearance.

It is another object of the invention to provide a passenger seat meal tray which protects the latching mechanism of the meal tray from accidental passenger impact and damage or release.

These and other objects of the present invention are achieved in the preferred embodiments disclosed below by providing a passenger seat meal tray latch assembly, comprising a pair of laterally spaced-apart latch plates for being secured to a surface of a seat back of a passenger seat directly above a meal tray stowage position, a cross-member for being positioned laterally across the surface of the seat back and locked to the seat back by releasable connection to the pair of latch plates, a latch mounted on the cross-member and movable between a retracted position for permitting the meal tray to be moved into and out of its stowage position and an extended position for latching the meal tray to the seat back.

According to one preferred embodiment of the invention, a pair of pins cooperates with respective latch plates and the cross-member for retaining the cross member on the seat back.

According to another preferred embodiment of the invention, the pair of pins are carried by the cross-member and include springs for maintaining the pins in a normally extended locking position with the cross-member locked to the latch plates.

According to yet another preferred embodiment of the invention, the cross-member is adapted for being positioned on the seat back over a dress cover portion.

According to yet another preferred embodiment of the invention, the cross-member includes a recess in an outer surface thereof, and the latch is positioned within in the recess.

According to yet another preferred embodiment of the invention, the latch comprises a rotatable latching member mounted for rotation on a pin positioned adjacent one end thereof and mounted to the cross-member, the extended position of the latch being with the latching member extending downwardly from the cross-member into interfering relation with a top edge of the meal tray and the retracted position being with the latching member extending laterally to one side of the pin in non-interfering relation with the top edge of the meal tray.

According to yet another preferred embodiment of the invention, the meal tray includes an upper edge which is adapted for cooperating with the latch, the meal tray being mounted on the passenger seat and movable between a stowage position flush against the surface of the seat back with the latch maintaining the meal tray in the stowage position, and a use position with the meal tray in a lowered position forward of a passenger seated behind the seat back.

According to yet another preferred embodiment of the invention, a passenger seat is provided, comprising a ladder frame assembly including a leg for being attached to a supporting surface, a seat bottom assembly carried by the ladder frame assembly, a seat back carried by the ladder frame assembly, and a meal tray carried by the passenger seat for being used by a passenger seated aft of the passenger seat. The passenger seat also comprises a pair of laterally spaced-apart latch plates for being secured to a surface of a seat back of a passenger seat directly above a meal tray stowage position, a cross-member for being positioned laterally across the surface of the seat back and locked to the seat back by releasable connection to the pair of latch plates, and a latch mounted on the cross-member and movable between a retracted position for permitting the meal tray to be into and out of its stowage position and an extended position for latching the meal tray to the surface of the seat back.

According to yet another preferred embodiment of the invention, a passenger seat is provided, comprising a ladder frame assembly including a leg for being attached to a supporting surface, a seat bottom assembly carried by the ladder frame assembly, and a seat back carried by the ladder frame assembly. A dress cover covers a seat back cushion assembly and seat back frame portions of the seat back. A meal tray is carried by the ladder frame assembly for being used by a passenger seated aft of the passenger seat, and a meal tray latch assembly. The meal tray latch assembly comprises a pair of laterally spaced-apart latch plates for being secured to a surface of a seat back of a passenger seat directly above a meal tray stowage position. A cross-member for being positioned laterally across the surface of the seat back and locked to the seat back by releasable connection to the pair of latch plates, and a latch mounted on the cross-member and movable between a retracted position for permitting the meal tray to be moved into and out of its stowage position and an extended position for latching the meal tray to the surface of the seat back.

According to yet another preferred embodiment of the invention, a pair of pins cooperates with respective latch plates and the cross-member for retaining the cross member on the seat back.

DESCRIPTION OF THE PREFERRED EMBODIMENT AND BEST MODE SEAT ASSEMBLY OVERVIEW

Figure 2:
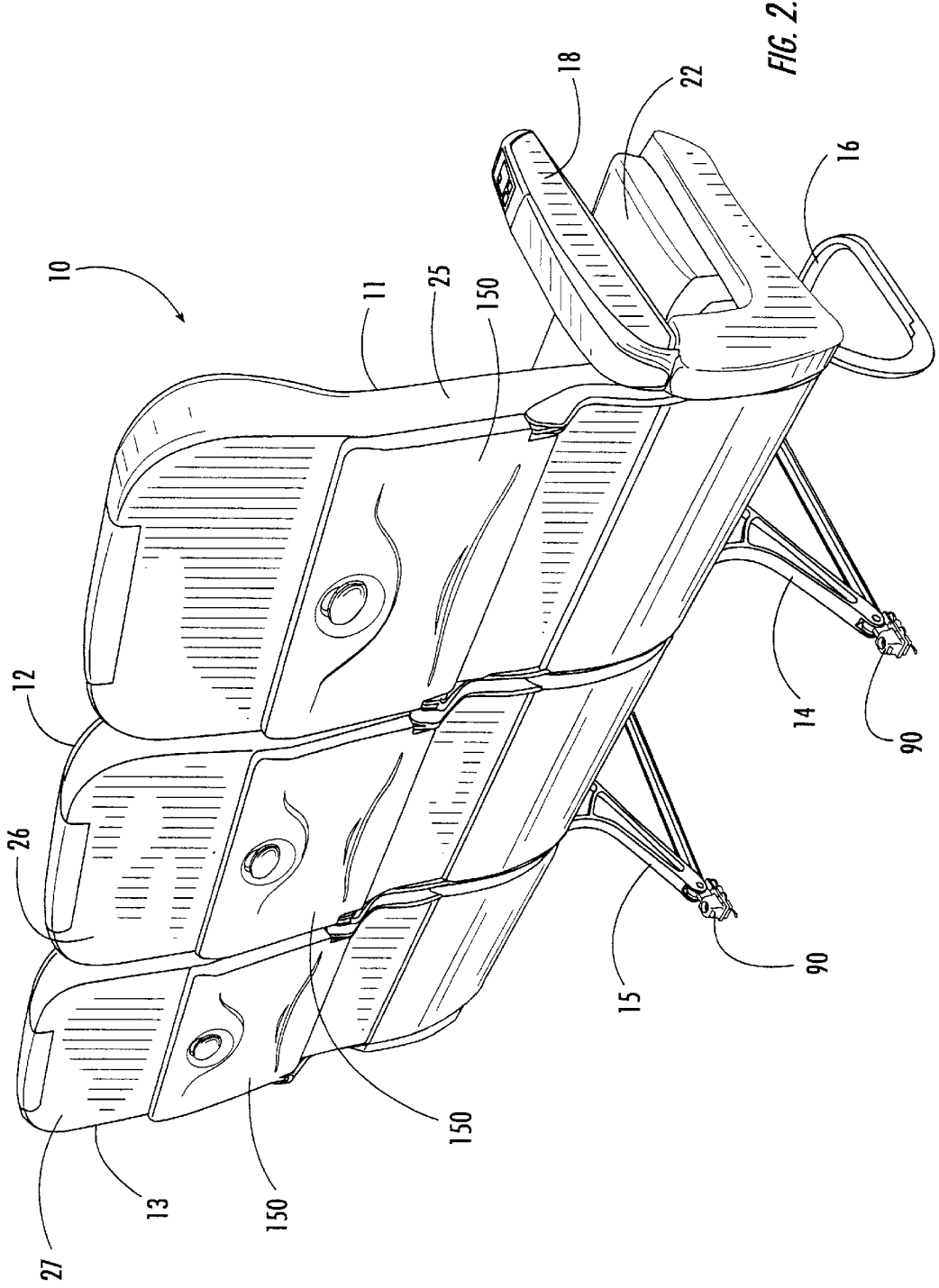
Figure 3:
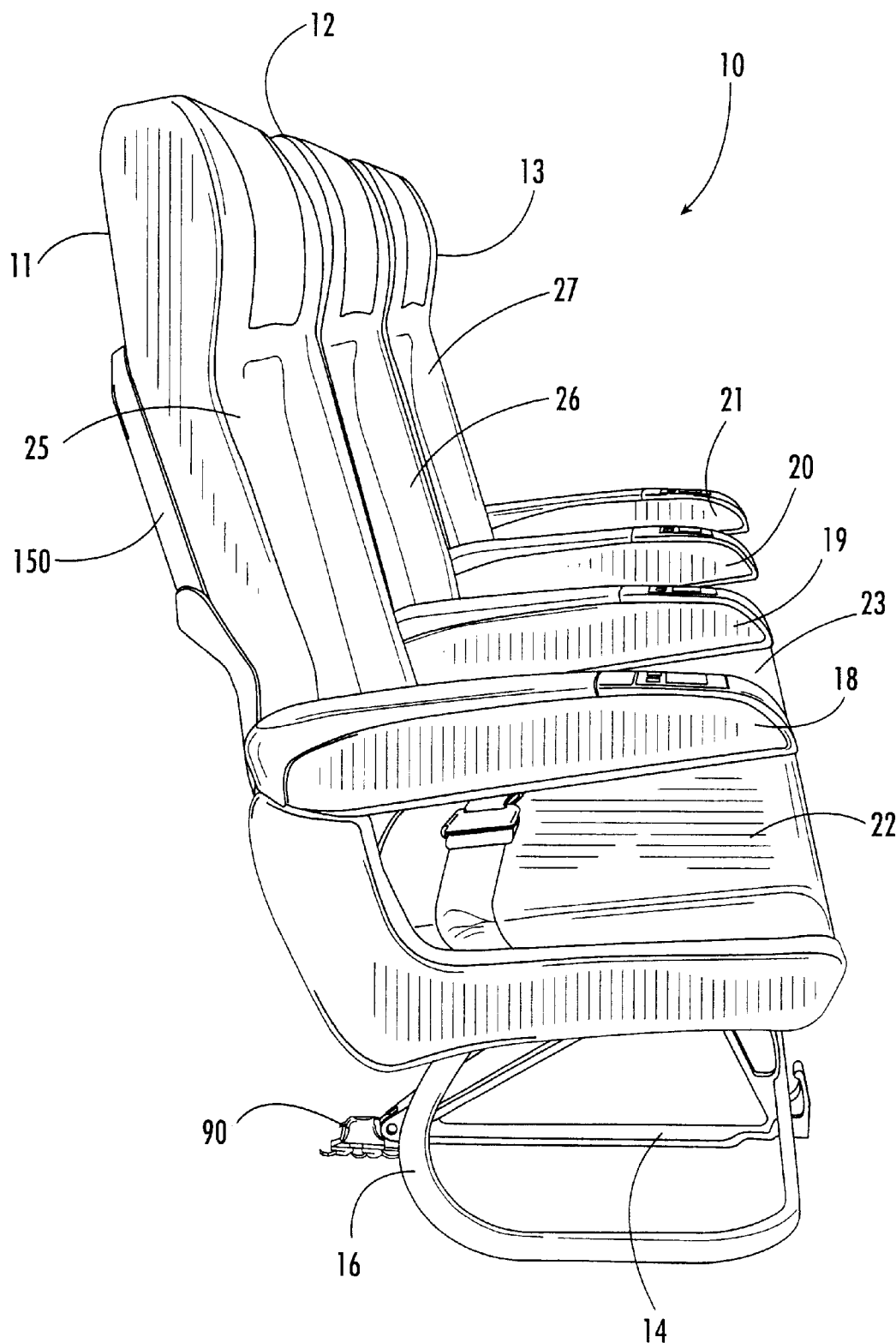

Referring now specifically to the drawings, an aircraft passenger seat set according to the present invention is illustrated FIGS. 1, 2 and 3 and shown generally at reference numeral 10. In the particular embodiment shown in FIGS. 1, 2 and 3, the seat set 10 is comprised of three adjacent seats, an aisle sea center seat 12 and a seat 13. The seat set 10 is supported on a pair of leg modules 14 and 15, and includes a baggage guard rail 16. The seats 11, 12 and 13 are provided with arm rests 18, 19, 20 and 21. The seats 11,12 and 13 include seat bottoms 22, 23 and 24, respectively, and seat backs 25, 26 and 27, respectively.

Figure 4:
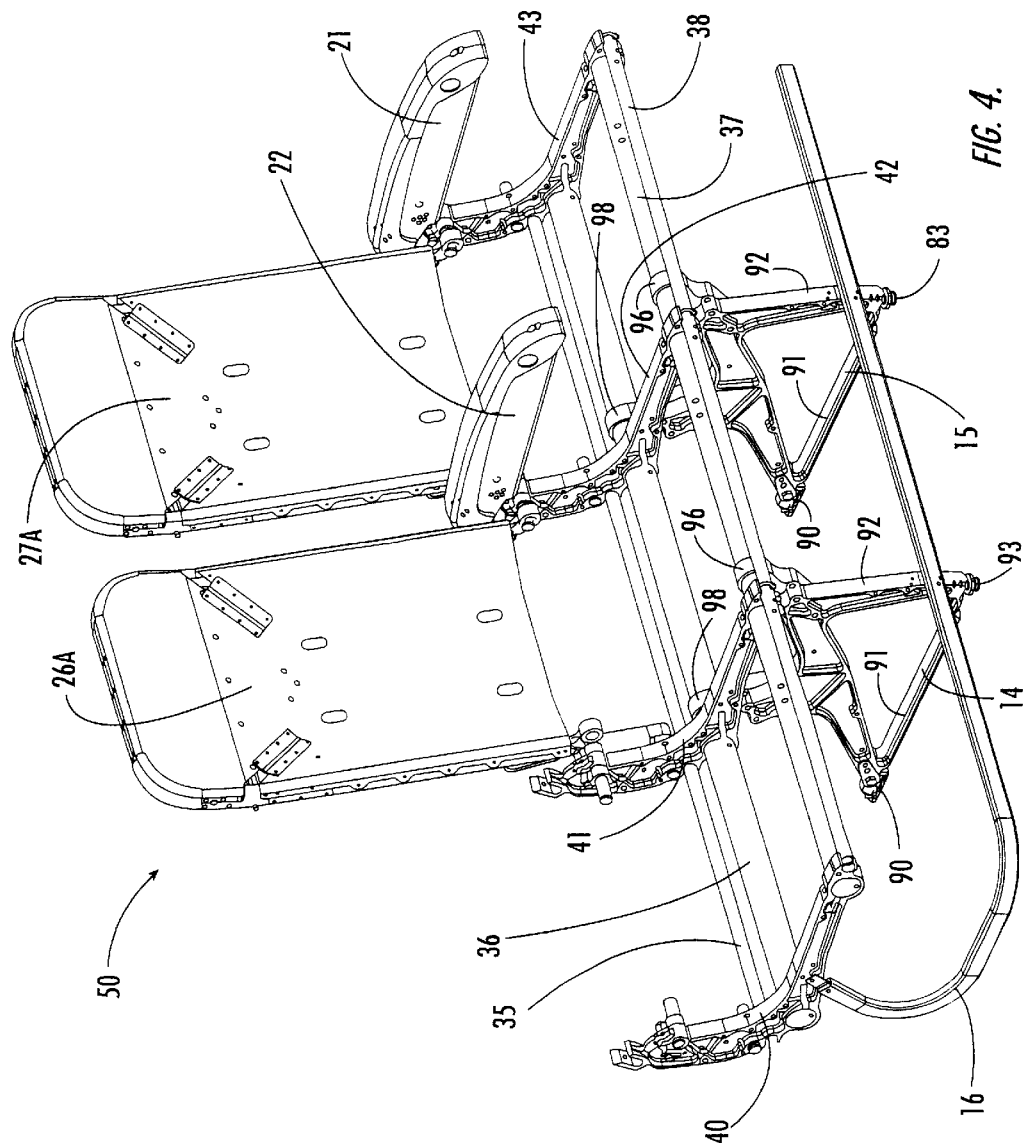
Figure 5:
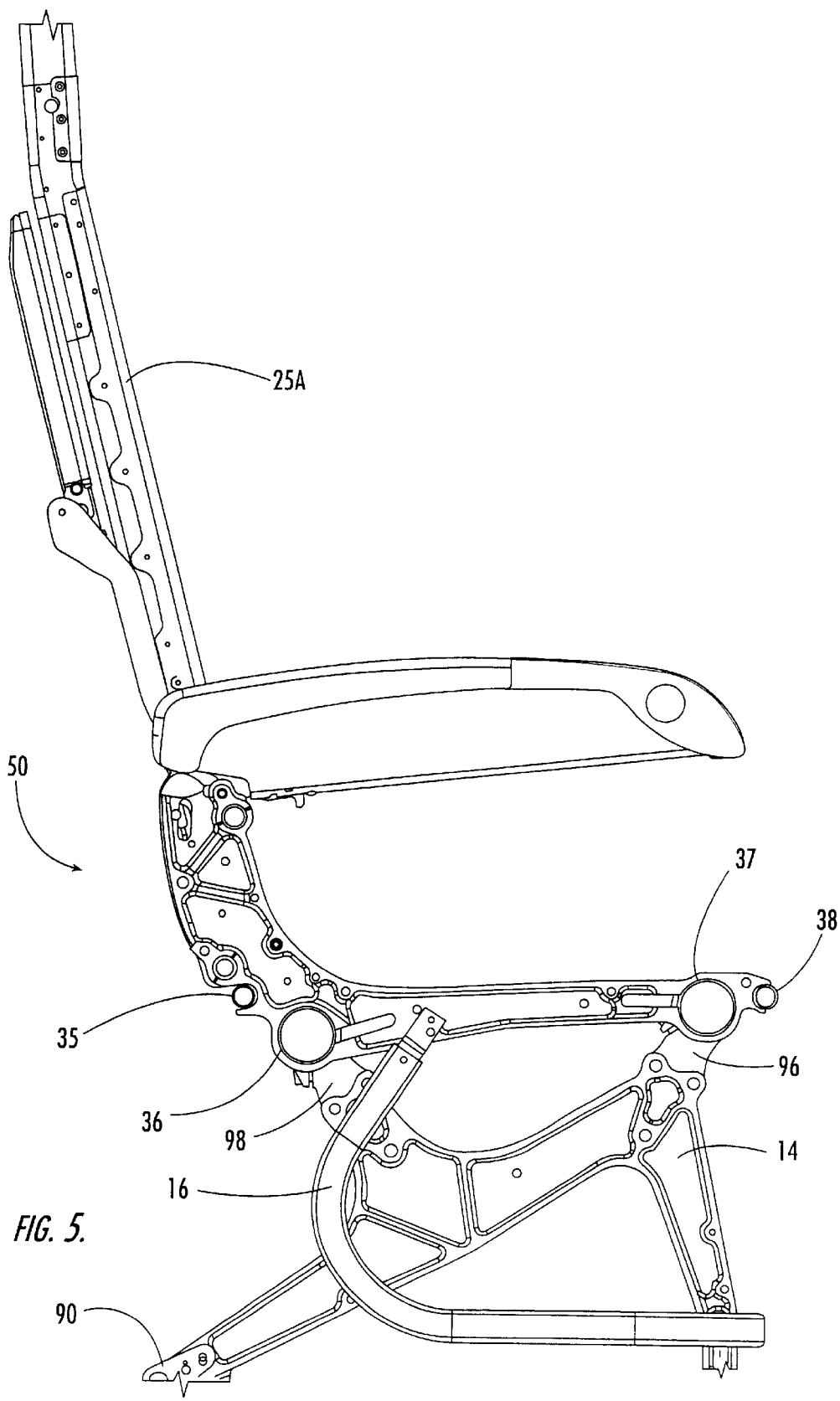

The internal structure of the seat set is shown in FIG. 4, with various parts eliminated for clarity. As is shown, the seat set 10 is supported on and thus shares the two leg modules 14 and 15. The leg modules 14 and 15 carry a set of four laterally-extending beam elements 35, 36, 37 and 38 on which are mounted four section assembly modules 40, 41, 42 and 43. The leg modules 14, 15; beam elements 35, 36, 37 and 38; and the section assembly modules 40, 41, 42 and 43 tie together the components in a manner necessary to form a seat set 10 having significant structural integrity within passenger comfort, fuselage size and government regulation requirements. The underlying structure defined by leg modules 14, 15; beam elements 35, 36, 37 and 38; and the section assembly modules 40, 41, 42 and 43 is referred to as a "ladder frame assembly" and is indicated at reference numeral 50 in FIGS. 4 and 5. The ladder frame assembly 50 carries seat back pans 26A, 27A, see FIG. 4, and seat back pan 25A, see FIG. 5.

Of course, the seats according to the present invention can be integrated together to form seat sets of different lengths, spacings, and numbers of seats. Whether one, two, three or more seats, each seat set 10 will include at least two leg modules, such as leg modules 14 and 15. Thus, when a seat is referred to as having a pair or a plurality of leg modules, it is understood that at least two leg modules are required, but that the two leg modules may not necessarily be on opposing sides of any particular seat. For example, in FIGS. 1–5, three seats 11, 12 and 13 are each supported on two leg modules 14, 15. Thus, seat 11 is supported on two leg modules 14, 15, just as are seats 12 and 13, and whether the seat set 10 is considered a "seat" or the three seats 11, 12 and 13 are considered "seats", in either case they are supported by a plurality of legs.

PROFILE SEAT BACK RECLINE LOCKING ASSEMBLY

Figure 6:
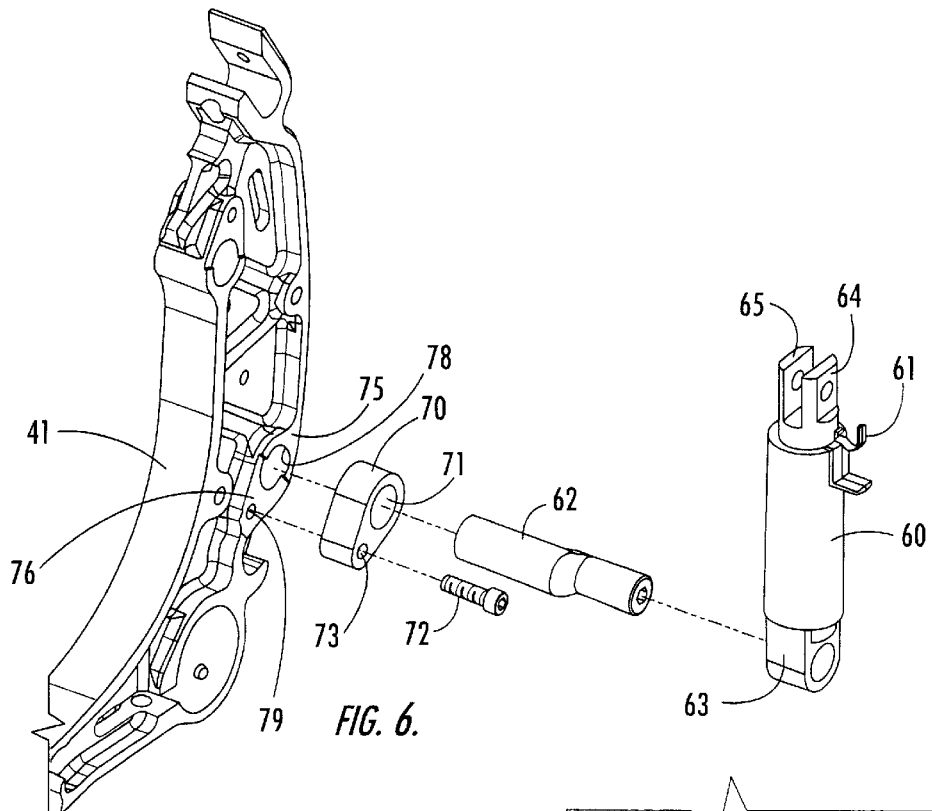
Figure 7:
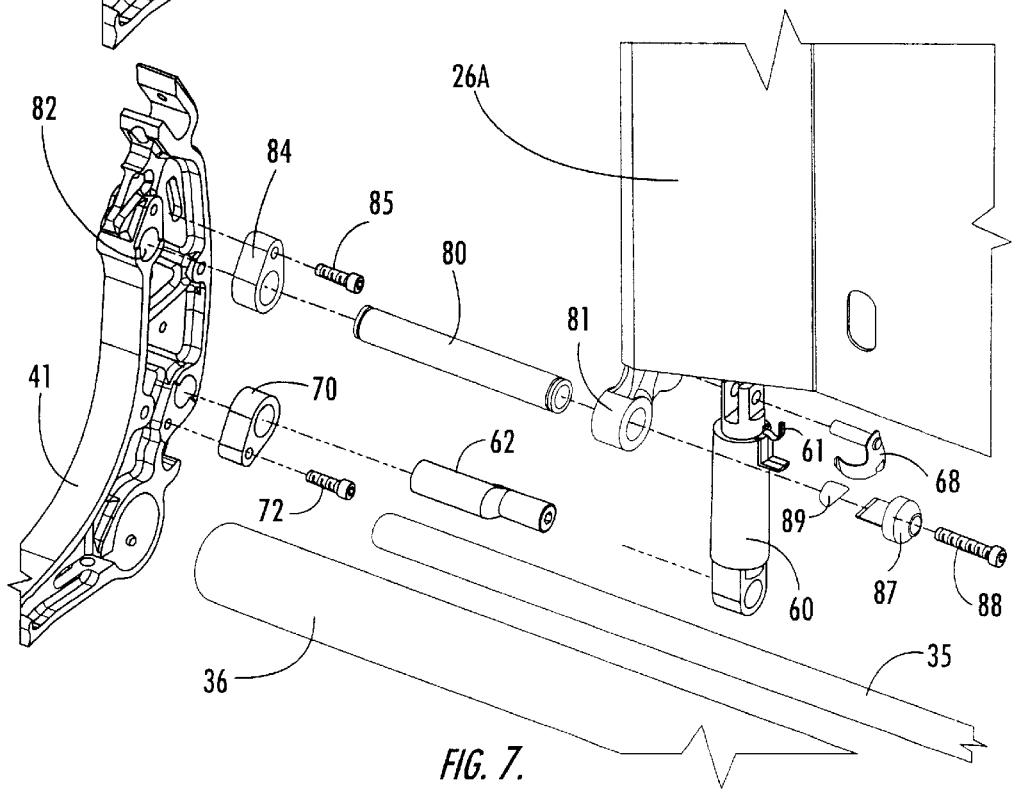

Referring now to FIGS. 6 and 7, a low profile seat back recline locking assembly is shown. A hydraulic cylinder 60 interconnects the section assembly module 41 and the seat back pan 25A. A control button, not shown, on the arm rest 19 can be depressed by the seat occupant to vary the recline angle of the seat back 26 relative to the seat bottom 23. The control button is connected to a control cable, not shown, which connects to the actuator 61 residing on top of the cylinder 60. When the control button is depressed, the actuator 61 unlocks the cylinder 60. Backward pressure on the seat back pan 25A allows the seat back pan 25A to recline. Release of back pressure on the seat back pan 25A by the seat occupant allows the seat back pan 25A to move forwardly to a more upright position. Release of the control button locks the seat back 25 in the current position.

The cylinder 60 is mounted for pivotal movement to the section assembly module by an offset pivot shaft 62 by a lower cylinder pivot bushing 63 and to the seat back pan 25A by a pair of upper cylinder pivot bushings 64, 65 between which fits a pivot bushing, not shown, residing behind the lower extent of the seat back pan 25A. The upper cylinder pivot bushings 64, 65 are locked in place by a lock pin 68, designed to be removable without tools.

The pivot shaft 62 is locked to the section assembly module 41 by a pear-shaped spacer collar 70 having a bore 71 into which the pivot shaft 62 extends. The spacer collar 70 is connected to the section assembly module 41 by a screw 72 which is threaded into a matingly threaded screw hole 73 in the small end of the spacer collar 70.

Note that the spacer collar 70 fits against a stepped surface portion of the section assembly module 41. The stepped surface portion includes a first portion 75 which is flush with the surrounding surface of the section assembly module 41 and a second portion 76 which is recessed below the surrounding surface of the section assembly module 41. The pivot shaft fits into a bore 78 in the section assembly module 41, and the screw 72 threads into a matingly threaded hole 79.

Thus, in order to lock the pivot shaft 62 against movement relative to the section assembly module 41, the screw 72 is tightened to the point where the smaller end of the spacer collar 70 is drawn inwardly into the recessed portion 76 of the section assembly module underlying the spacer collar 70. This tilting movement creates a misalignment of the axis of the spacer collar 70 relative to the axis of the pivot shaft 62, thus locking the pivot shaft 62 against both axial and rotational movement relative to the section assembly module 41. As the seat back pan 25A moves, the cylinder 60 pivots about the pivot shaft 62.

Similarly, the seat back pivot shaft 80 is mounted in a pivot bushing 81 on the seat back pan 25A and in a bore 82 in the section assembly module 41. The seat back pivot shaft 80 is locked to the section assembly module 41 by a spacer collar 84. In the same manner as described above, the spacer collar 84 sits over a stepped portion of the surface of the section assembly module 41, so that when the screw 85 is tightened, the small end of the spacer collar 84 is misaligned, locking the seat back pivot shaft 80 in a fixed position relative to the section assembly module 41.

The spacer collars 70 and 84 are preferably manufactured from extrusion and thus can be easily made in any desired thickness.

The seat back pivot shaft 80 is attached to the pivot bushing by a fastener 87. A screw 88 is threaded into the fastener 87, which includes a misaligned portion 89. As the screw 88 is tightened, the misaligned portion 89 becomes progressively more misaligned, securing the seat back pivot shaft 80 to the pivot bushing 81 of the seat back pan 25A.

As is shown in FIG. 7, beam elements 35 and 36 carry the section assembly module 41, also as shown in FIG. 4, together with the beam elements 37 and 38.

The cylinder 60 is very compact approximately 5 inches between attachment points, and has a ½ inch stoke. By locating the actuator 61 astride the cylinder 60, the overall length is further reduced. This shorter length allows the cylinder 60 to be located in a nearly vertical position to one side of and behind the seat occupant. The seat bottom pan therefore has a clean appearance without local protuberances. As a result, the bottom cushion can be thinner, less complex, more comfortable and lighter than those in current use. Recline of the seat back 26 is unaffected, and is completely transparent to the seat occupant.

SEAT FRAME CONSTRUCTION

Figure 8:
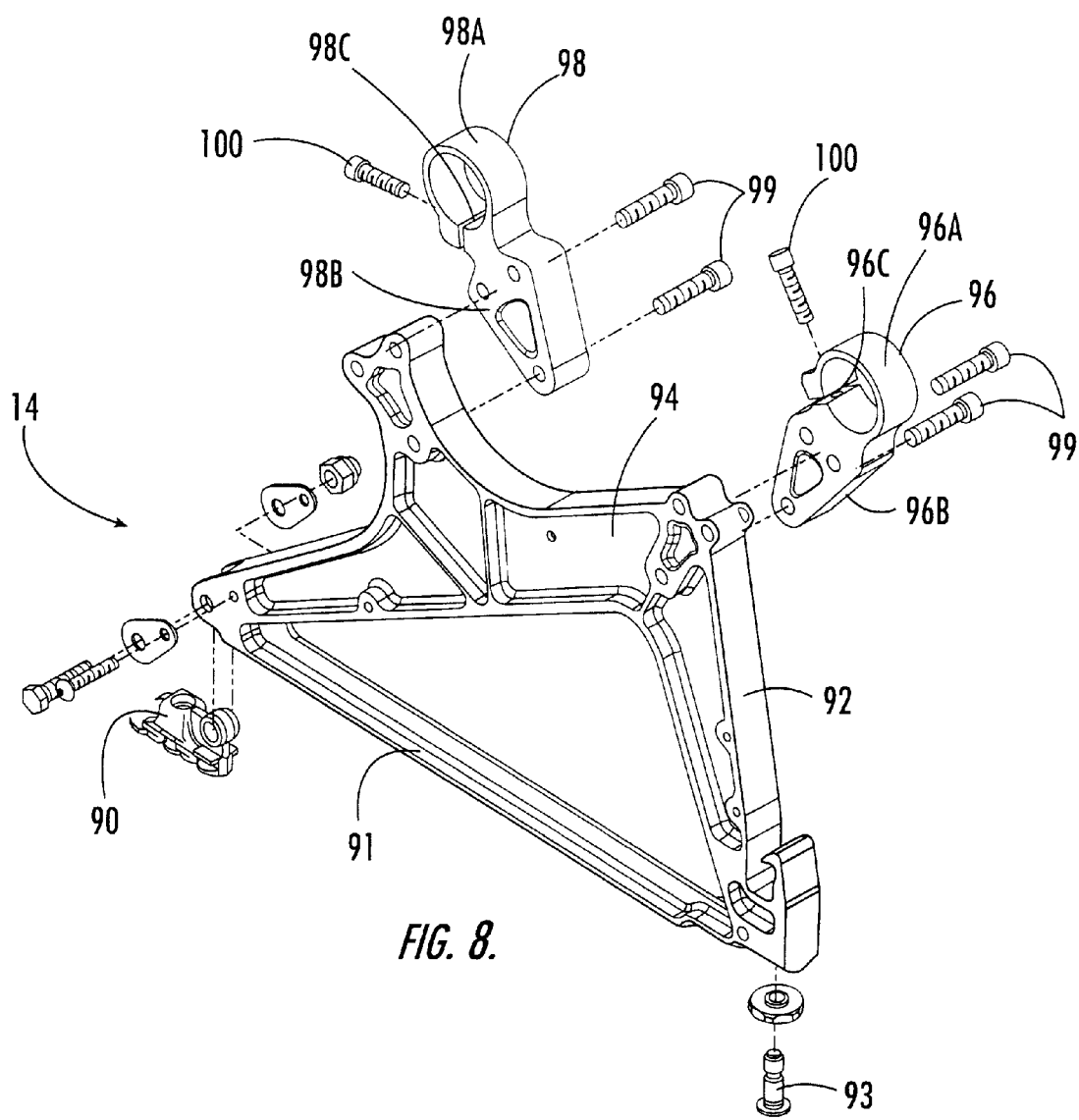

Referring now to FIG. 8, leg module 14 is described in further detail. Leg module 14 includes a rear floor track fitting 90 by which the seat set 10 is attached to a track extending along the fuselage deck from front to rear, a floor tie assembly 91, a front leg 92, a front track fitting 93, and a diagonal leg tie 94. A pair of joint clamps 96, 98 are provided and comprise an annular collar element 96A, 98A, respectively, which receive the beam elements 37, 36, and attachment elements 96B, 98B, respectively, by which the joint clamps 96, 98 are attached to the leg module 14.

The joint clamps 96, 98 are secured by screws 99 to the top of the front leg 92 and the diagonal leg tie 94, respectively. The joint clamps 96, 98 include axially extending splits 96C, 98C, respectively, which permit the collar elements 96B, 98B to be spread sufficiently to permit insertion of the beam elements 37, 36. Screws 100 permit the collar elements 96B, 98B to be tightened for locking the beam elements 37, 36 in place in a predetermined position, and loosened for permitting the beam elements 37, 36 to the removed from or shifted axially within the collar elements 96B, 98B.

As shown in FIG. 4, the section assembly modules 41 and 42 are mounted to the beam elements 37, 36 in an offset position relative to the joint clamps 96, 98 and form the ladder frame assembly 50.

Referring now to FIGS. 9, 10 and 11, the manner in which the joint clamps 96, 98 may be used to vary seat spacing is illustrated. As noted above, spacing between parallel sets of floor tracks is generally fixed, so that the need to have seats with varying spacing in prior art constructions has been accommodated by having differently-constructed leg modules with various offsets to the left or right of the centerline of the leg module. By using the joint clamps 96, 98, seat spacing is varied using the same components, avoiding the need to have a number of differently-constructed leg modules and components. For example, in FIG. 9 the joint clamps 96, 98 are positioned on the right side of the leg modules 14, 15. The location of the collars 96A, 98A permit the section assembly modules 41, 42 to be positioned in vertical alignment with or to the left of the leg modules 14, 15.

In FIG. 10 the joint clamps 96, 98 are positioned on the left side of the leg modules 14, 15, permitting the section assembly modules 41, 42 to be positioned in vertical alignment with or to the right of the leg modules 14, 15.

In FIG. 11 the joint clamps 96, 98 are positioned inboard of the leg modules 14, 15, permitting the section assembly modules 41, 42 to be positioned in vertical alignment with or outboard of the leg modules 14, 15. Even though not shown, it is also apparent that the joint clamps can be both positioned outboard of the leg modules 14, 15, permitting the section assembly modules 41, 42 to be positioned in vertical alignment with or inboard of the leg modules 14, 15. The attachments are not permanent, so that modifications to the seat spacing requirements can be quickly and easily accomplished.

SEAT BACK BREAKOVER ASSEMBLY

Referring now to FIGS. 12, 13, 13A–C and 14, a breakover assembly 100 for a passenger seat such as the passenger seat 11 is shown. The breakover assembly 100 is intended to normally prevent the seat back 25, see FIG. 5, from pivoting forward past an upright position towards the seat bottom 22, while allowing this movement if struck with a sufficiently hard forwardly-directed force, such as might occur if hit from the rear by an occupant seated directly behind the seat. The purpose of the breakover assembly 100 is to prevent damage to the seat 11 resulting from a severe rear impact and to at least reduce injury to an occupant thrown against the rear of the seat back by allowing the seat back to move forwardly in a controlled manner.

In general, this is effected by utilizing a bent steel wire to resist impact up to a certain predetermined load, and then absorb the energy by forcing the bend in the wire rearwardly relative to the wire, forwardly relative to the seat, and giving off excess energy in the form of heat.

Figure 12:
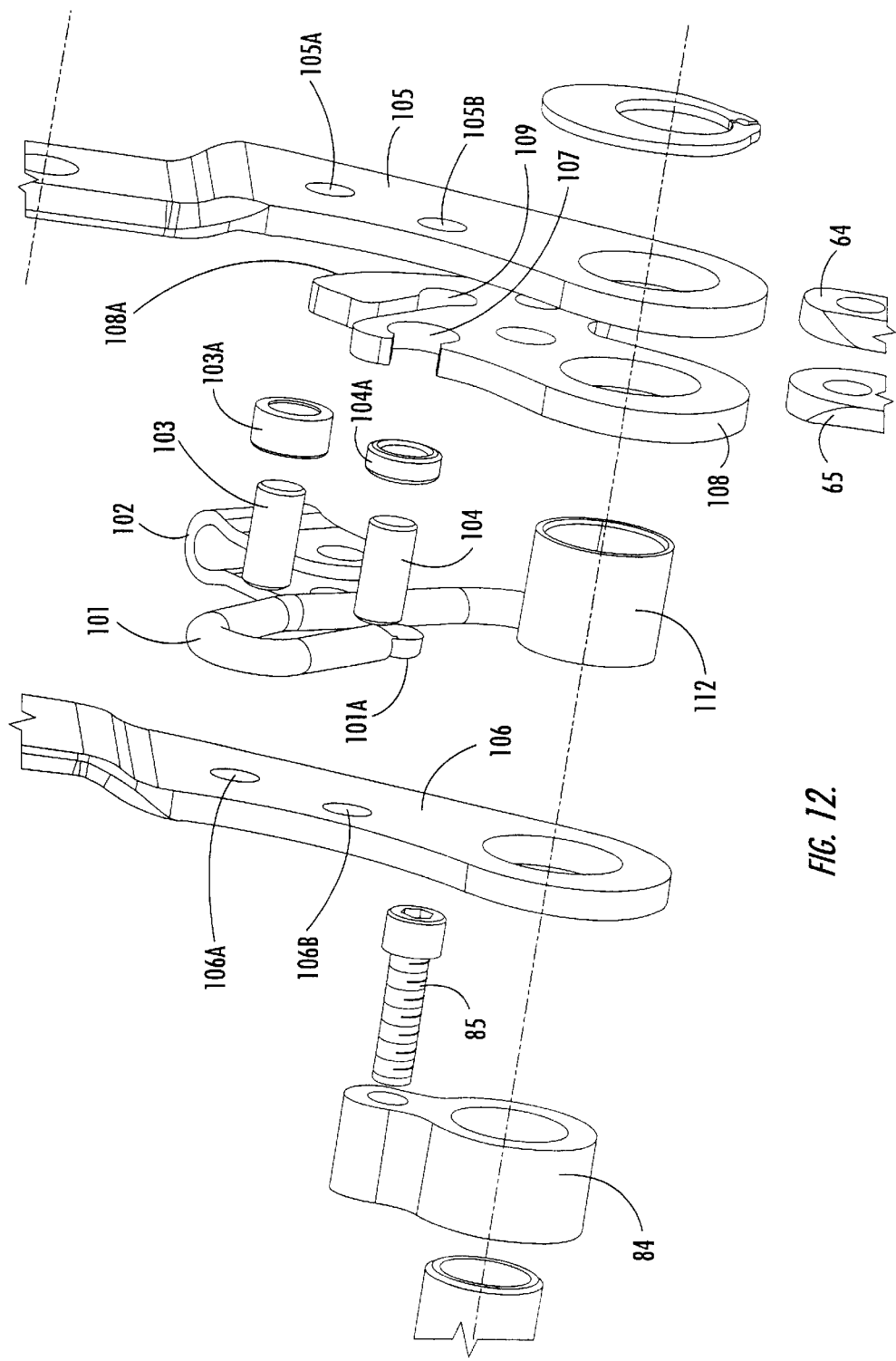
Figure 13:
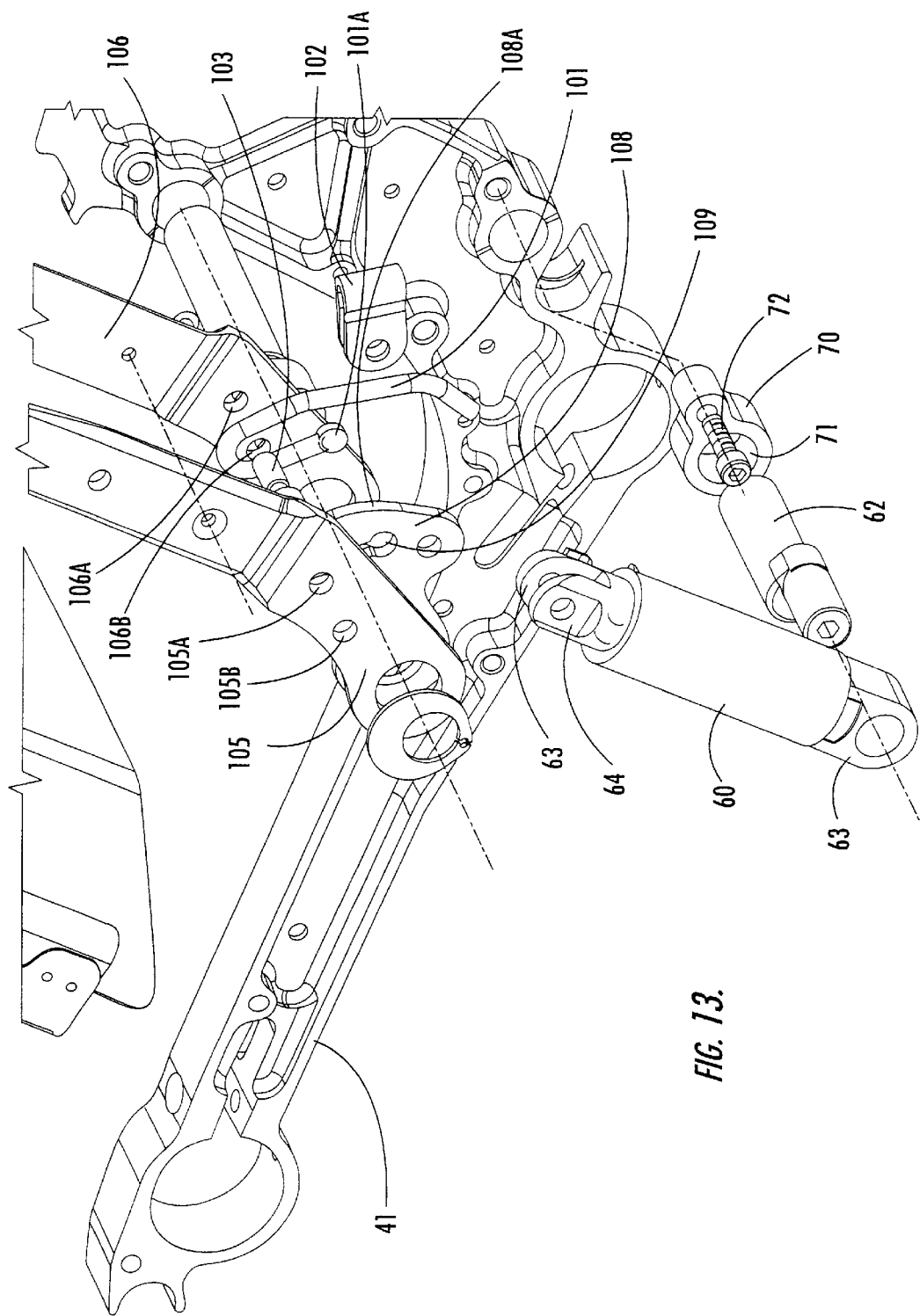
Figure 13A:
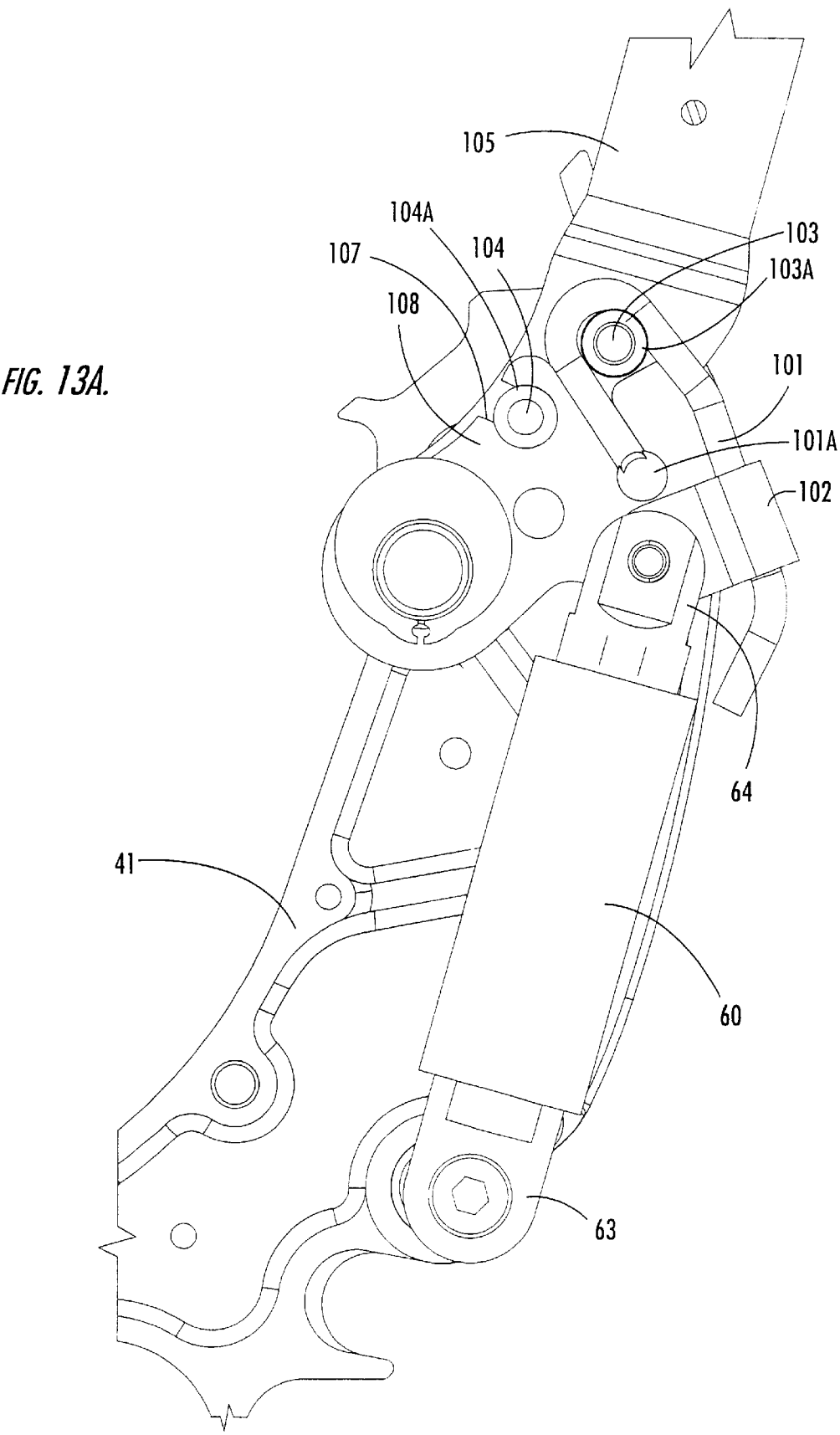
Figure 13B:
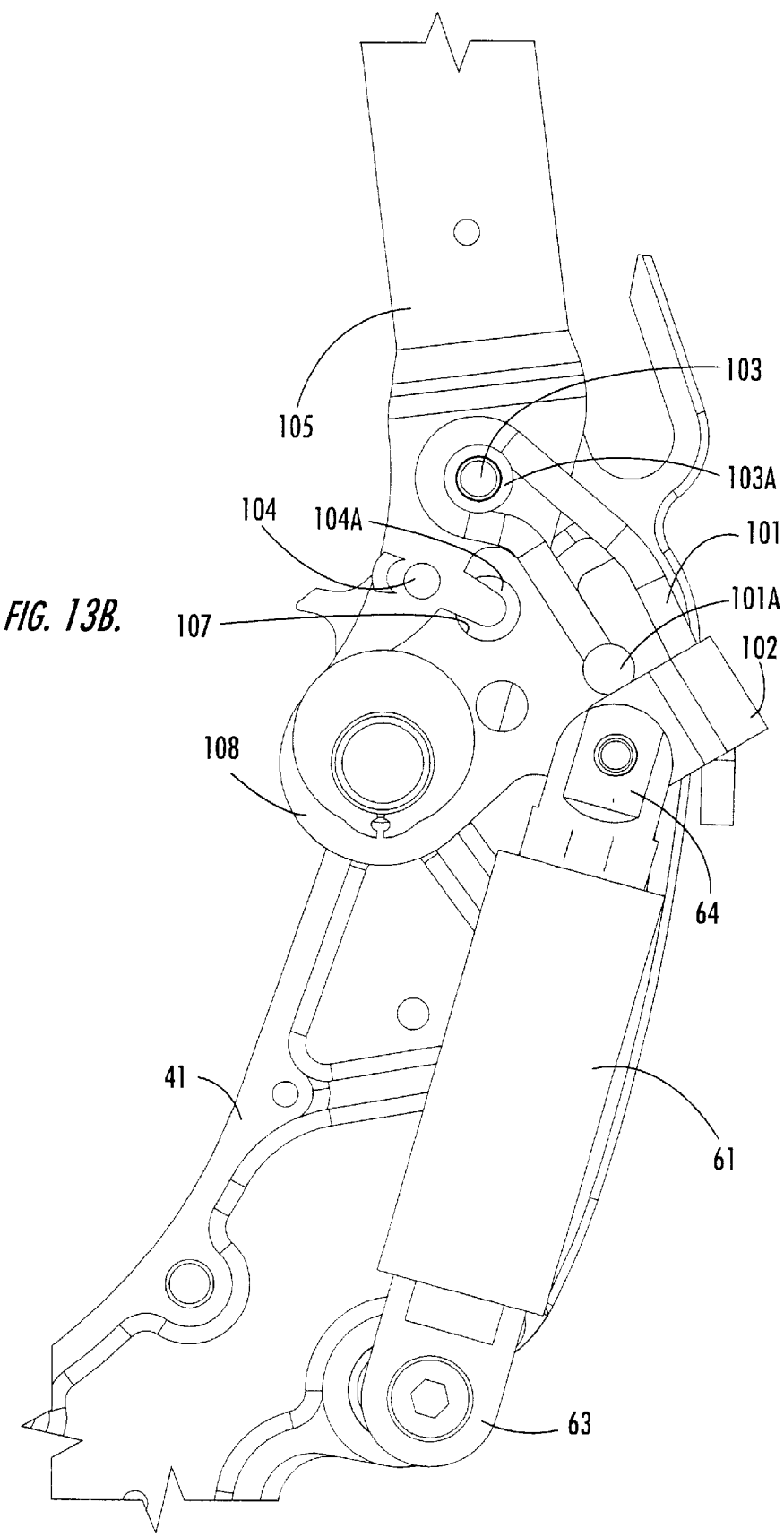
Figure 13C:
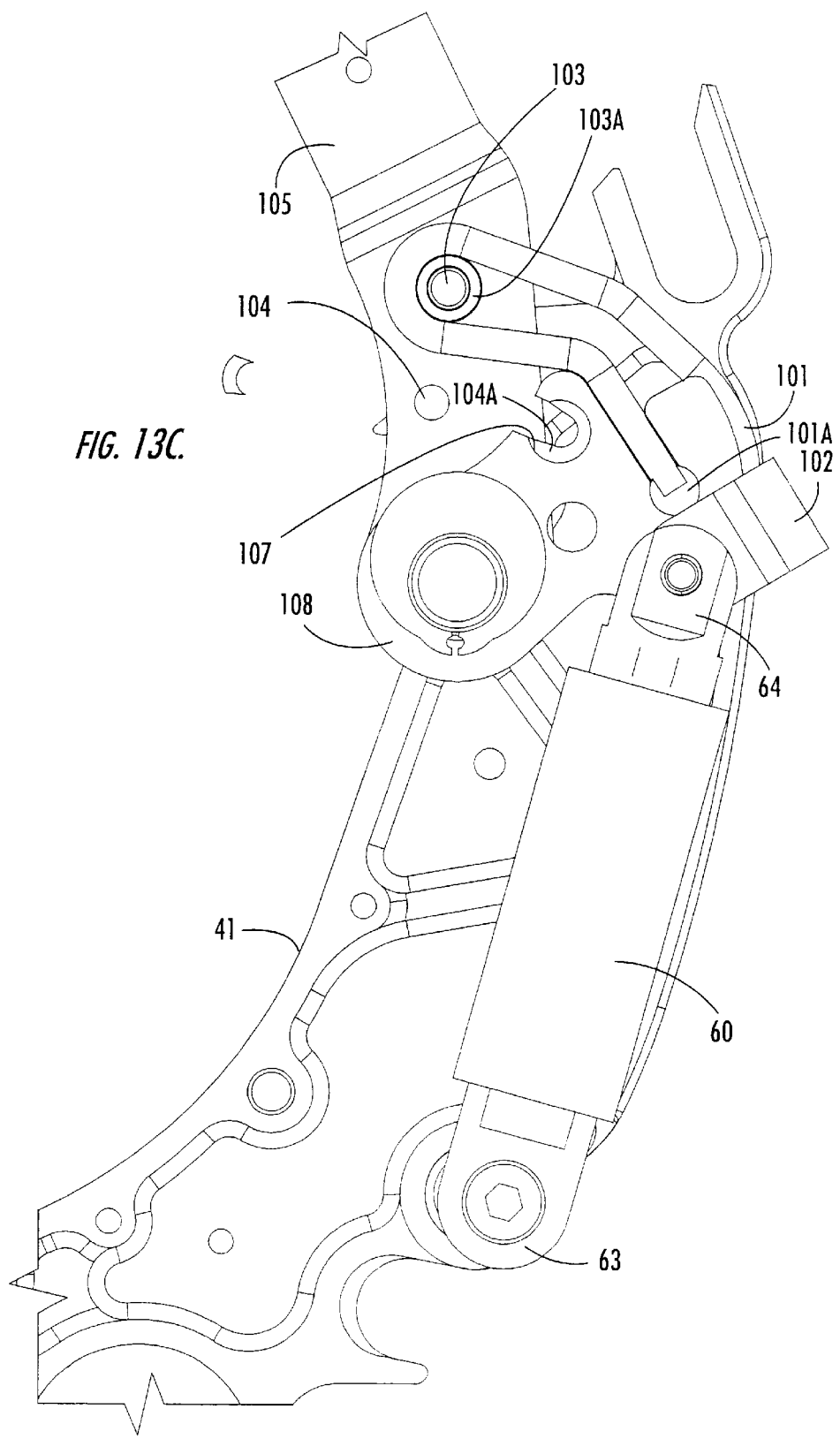
Figure 14:
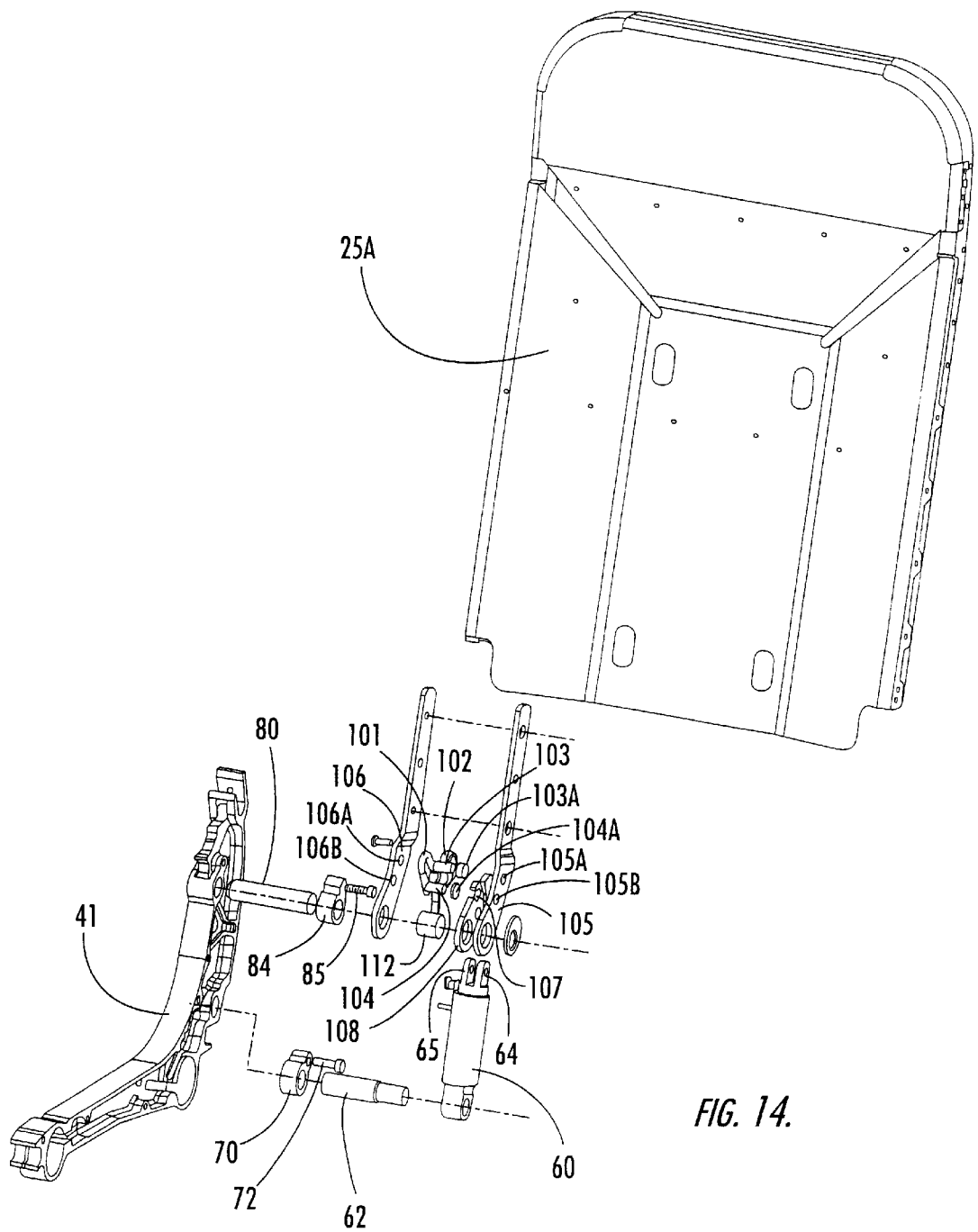

Specifically, a bent steel wire 101 as is shown in the simplified view of FIG. 12 is captured by a retainer bracket 102. The steel wire is a 0.235 inch 1018 grade wire. An energy-absorbing roller 103 and bushing 103A are positioned inside the bend of the steel wire 101. The roller 103 is captured in holes 105A and 106A in back supports 105,106, respectively and thus must move in unison with the back supports 105, 106. The bushing 103A resides in lateral alignment with the steel wire 101 inside the bend.

A shear pin 104 carrying a shear bushing 104A thereon is captured in holes 105B and 106B in back supports 105, 105, respectively. The shear bushing 104A is captured in an annular recess 107 in a quadrant member 108. The steel wire 101 fits around the back side 108 of the quadrant member 108, with the forward portion of the wire 101 positioned in the elongate slot 109. The forward portion of the wire 101 is retained in slot 109 by an enlarged head 101 A which fits within an annular recess at the end of the slot 109. See FIG. 13.

The entire seat back 25 pivots on the pivot bushing 112 on which the back supports 105, 106 and quadrant 108 are positioned. See FIG. 14. Other components shown are illustrated and described above.

In operation, an abnormal force, for example, the impact of a passenger on the rear of the seat during a 16 g event will cause the seat back 25 to move forward while the quadrant 108 remains stationary. The shear bushing 104A fits snugly within the recess 107 and thus quickly breaks. The shear bushing 104A is designed to break upon impact of between 180–220 pounds on the top of the seat back 25. See FIGS. 13A, 13B. The width of the shear bushing 104A can be varied, and in doing so the amount of force required to break the shear bushing 104A can be varied. The wire 101 is protected from any load until the shear bushing 104A breaks.

As the shear bushing 104A breaks, the seat back 25 continues forward, bringing the bushing 103A up against the back of the inside of the bend in the wire 101. As the seat back 25 continues forward, the bushing 103A continues forward, and the wire 101 is pulled around the bushing 103A, moving the position of the bend. See FIG. 13C. Energy is absorbed in two ways, movement of the position of the bend along the length of the wire 101 and heat released as the wire 101 thus bent.

Wire 101 is designed to begin movement at 150 pounds of force, and permits the seat back 25 to move through a maximum arc of 70 degrees. The combined use of the sacrificial bushing 104A and the wire 101 controls the movement of the seat back 25 in such a manner that survivability of the passenger is improved at an impact force as low as 1 G. The seat back 25 can be returned to its normal position by pushing it rearward using less than a 35 lbs force.

When the seat back must be moved forward for maintenance or cleaning, the lock pin 68 may be removed, disconnecting the hydraulic seat recline cylinder 60 from the retainer bracket 102 and the seat back 25. In this configuration the seat back 25 may be moved forward to the breakover position without interfering with the quadrant 108.

MEAL TRAY ASSEMBLY—PREFERRED EMBODIMENT

Figure 15:
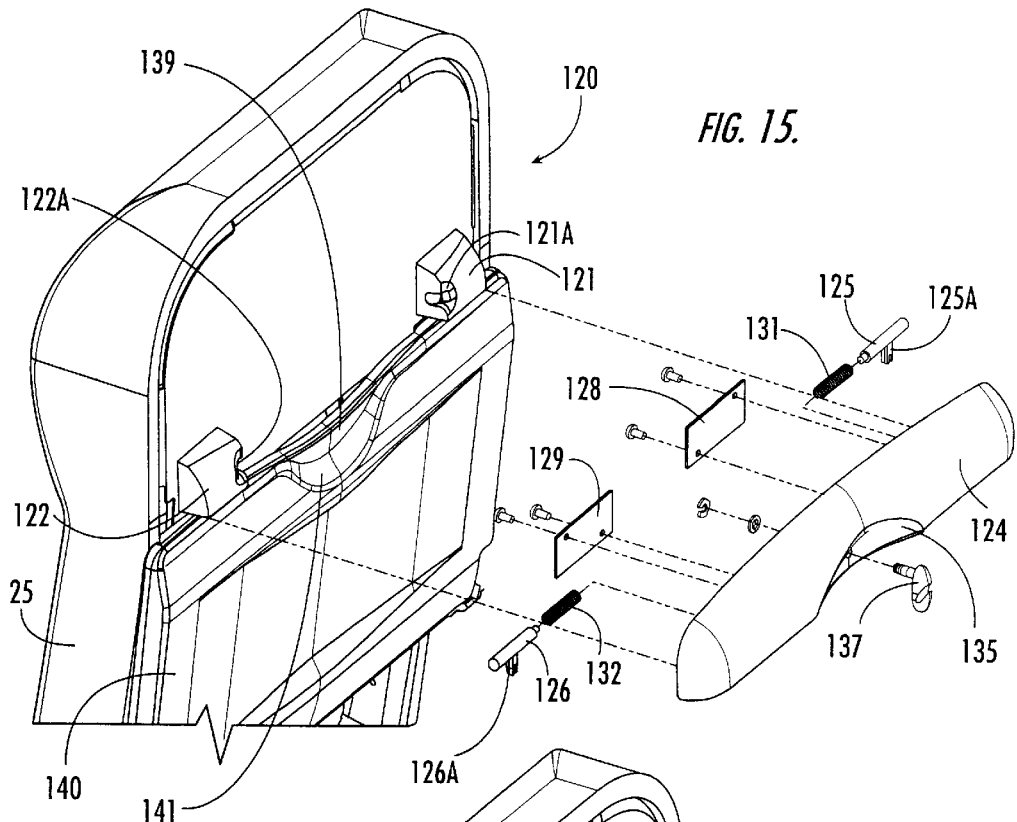
Figure 16:
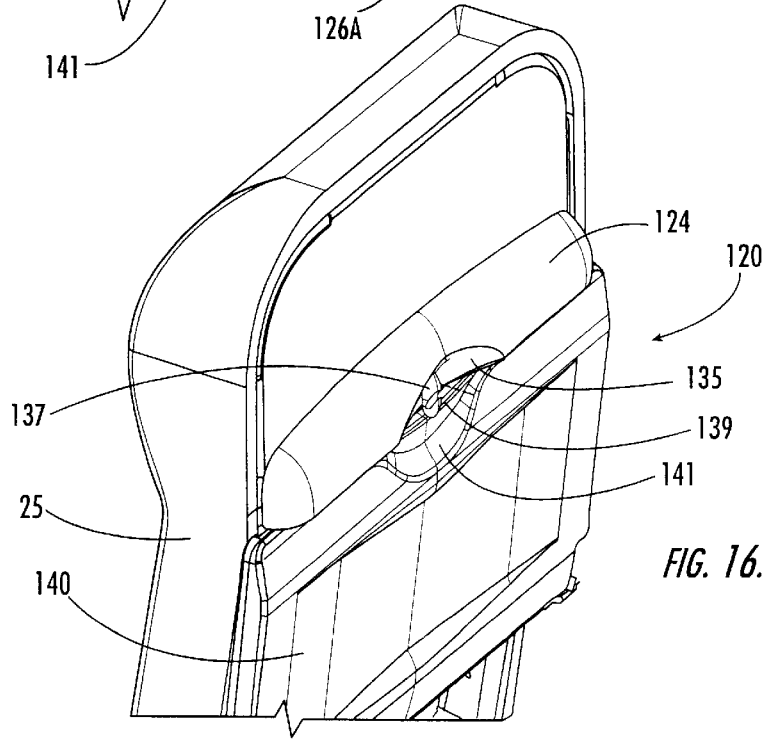

Referring now to FIGS. 15 and 16, a meal tray assembly 120 according a preferred embodiment of the invention is illustrated. The meal tray assembly includes a pair of laterally spaced-apart latch plates 121, 122 connected to the back surface of the seat back pan 25A of passenger seat 11 directly above a meal tray stowage position. The latch plates 121, 122 include inwardly-facing pin retention recesses 121A, 122A, respectively. The dress cover of the seat back 25 is around the latch plates 121, 122 so as not to interfere with the latch plates 121, 122 when the dress cover is removed for cleaning or replacement.

A cross-member 124 is positioned laterally across the surface of the seat back pan 25A and releasably locked to the seat back pan 25A by a pair of locking pins 125, 126, which are mounted in recesses, not shown, in the back side of the cross-member 124 by a pair of cover plates 128, 129. The cross-member 124 is positioned over the dress cover. The locking pins 125, 126 are biased in the locked position by springs 131, 132. When the cross-member 124 is placed against the back of the seat back pan 25A and over the latch plates 121, 122, the locking pins 125, 126 extend into the retention recesses 121A, 122A and lock the cross-member 124 to the back of the seat back pan 25A.

The cross-member 124 is contoured to define a central recess 135. A rotatable "barn door" latching member 137 is positioned within the recess 135 and is movable between an extended position with the latching member 137 extending downwardly from the cross-member 124 into interfering relation with a top edge 139 of a meal tray 140, and a retracted position with the latching member 137 extending laterally to one side within the recess 135 in non-interfering relation with the top edge 139 of the meal tray 140. The meal tray 140 also includes a recess 141 which communicates with the top edge 139 of the meal tray 140. The recess 135 in the cross-member 124 and the recess 141 in the meal tray 140 collectively form a recess within which the latching member 137 resides, and thus prevents inadvertent impact from passing passengers which could cause deployment of the meal tray 140.

The locking pins 125, 126 are manually operable by downwardly-extending fingers 125A, 126 from the lower side of the cross-member 124 when the meal tray 140 is in its deployed position.

Installation is accomplished withouttools. Repairs and part replacement may be made without tools and without removing the dress cover from the seat back 25.

MEAL TRAY ASSEMBLY-ALTERNATIVE EMBODIMENT

Figure 17:
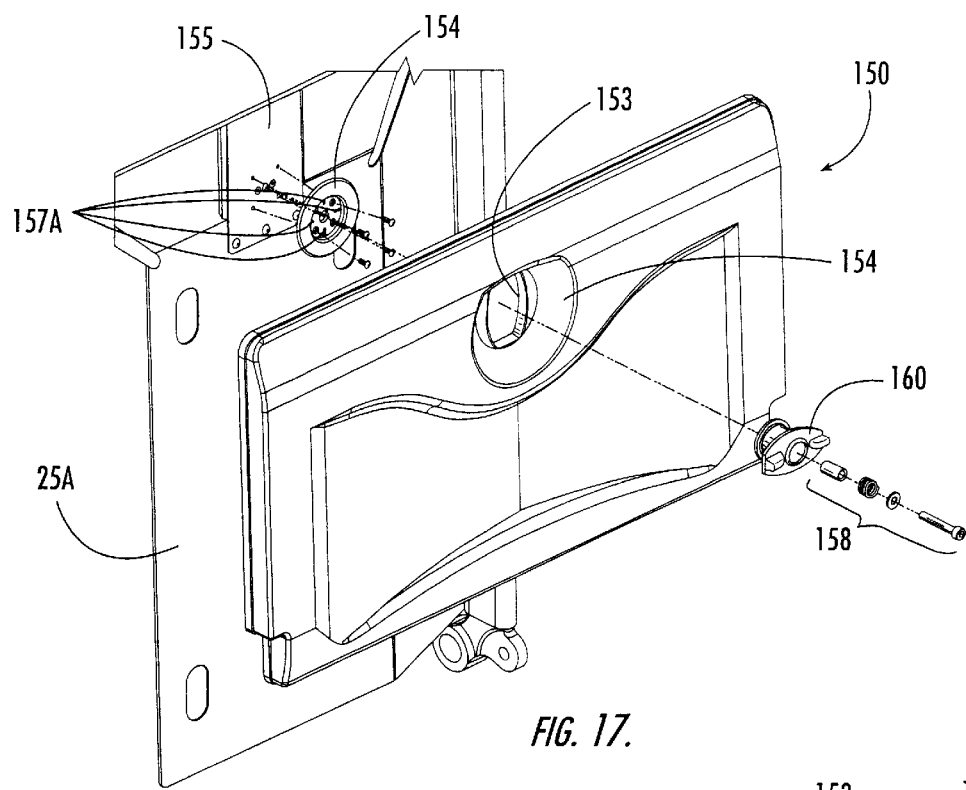
Figures 18, 19:
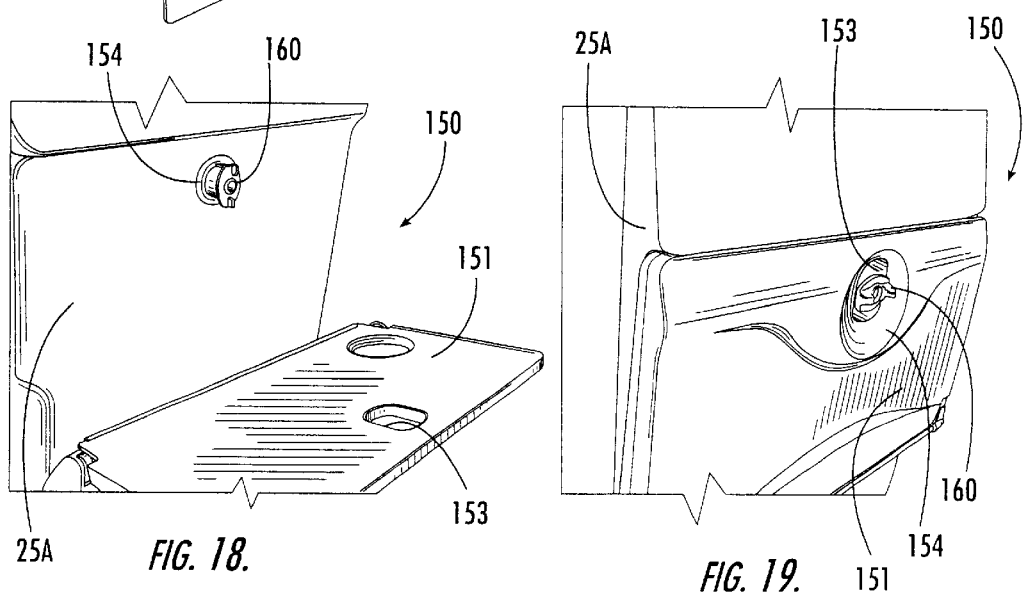

Referring now to FIGS. 17, 18 and 19, an alternative embodiment meal tray assembly 150 is shown. A meal tray 151 is mounted for movement between a stowage position flush against the back side of a seat back pan 25A, FIG. 19, and a lowered, horizontal use position, FIG. 18. An elongate latch access port 153 extends through the meal tray 151 near its top edge. Note that the latch access port is "subflush" to the bottom surface of the meal tray 151, and is surrounded by a recess 154.

A latch mounting plate 155 is secured to the back side of the seat back pan 25A, to which is mounted an annular detent plate 157. Detent plate 157 includes four 90 degree detent dimples 157A molded into the face. An elongate latch 160 is carried by the detent plate 157 by a pin assembly 158 and is rotatable between a release position, shown in FIG. 18, where the elongate latch 160 may be aligned with and extended through the elongate latch access port 153 for permitting movement of the meal tray 151 to and from the stowage position and the use position. When the meal tray 151 has been moved to the stowage position with the latch 160 extending though the latch access port 153, the latch 160 is rotated in either the clockwise or counterclockwise direction 90 degrees. The latch 160 overlaps the edge of the latch access port 153 and is caught on the edge of the meal tray 151 surrounding the latch access port 153, locking the meal tray 151 in the stowage position.

To release the meal tray 151 and allow it to be moved to the use position, the latch 160 is rotated a further 90 degrees in either direction and into alignment with the lengthwise axis of the latch access port 153. In this position, the meal tray 151 may be lowered past the latch 160 and into the use position.

Because the latch 160 captures the meal tray 151 through the latch access port 153, inadvertent disengagement of the meal tray 151 by force applied in any direction is prevented, in contrast with current "barn door" latches. In addition, the recess 154 around the latch access port 153 prevents inadvertent rotation of the latch 160 and deployment of the meal tray 151 to the use position, as might otherwise occur when a passenger brushes against the tray while moving to or from his or her own seat.

A passenger seat, passenger seat meal tray assembly and meal tray latch assembly are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A passenger seat meal tray latch assembly, comprising:
   (a) a pair of laterally spaced-apart latch plates for being secured to a surface of a seat back of a passenger seat directly above a meal tray stowage position;
   (b) a cross-member for being positioned laterally across the surface of the seat back and locked to the seat back by releasable connection to the pair of latch plates; and
   (c) a latch mounted on said cross-member and movable between a retracted position for permitting the meal tray to be moved into and out of its stowage position and an extended position for latching the meal tray to the seat back.

2. A passenger seat meal tray latch assembly according to claim 1, and including a pair of pins cooperating with respective latch plates and said cross-member for retaining the cross member on the seat back.

3. A passenger seat meal tray latch assembly according to claim 2, wherein said pair of pins are carried by-said cross-member and include springs for maintaining said pins in a normally extended locking position with the cross-member locked to the latch plates.

4. A passenger seat meal tray latch assembly according to claim 1, wherein said cross-member is adapted for being positioned on said seat back over a dress cover portion.

5. A passenger seat meal tray latch assembly according to claim 1, wherein said cross-member includes a recess in an outer surface thereof, and wherein said latch is positioned within in said recess.

6. A passenger seat meal tray latch assembly according to claim 1, wherein said latch comprises a rotatable latching member mounted for rotation on a pin positioned adjacent one end thereof and mounted to said cross-member, the extended position of said latch being with said latching member extending downwardly from the cross-member into interfering relation with a top edge of the meal tray and the retracted position being with said latching member extending laterally to one side of the pin in non-interfering relation with the top edge of the meal tray.

7. A passenger seat meal tray latch assembly according to claim 1, and including a meal tray, an upper edge of which is adapted for cooperating with the latch, said meal tray being mounted on the passenger seat and movable between a stowage position flush against the surface of the seat back with the latch maintaining the meal tray in the stowage position, and a use position with the meal tray in a lowered position forward of a passenger seated behind the seat back.

8. A passenger seat, comprising:
   (a) a ladder frame assembly including a leg for being attached to a supporting surface;
   (b) a seat bottom assembly carried by the ladder frame assembly;
   (c) a seat back carried by the ladder frame assembly;
   (d) a meal tray carried by the passenger seat for being used by a passenger seated aft of the passenger seat; and comprising:
      (i) a pair of laterally spaced-apart latch plates for being secured to a surface of a seat back of a passenger seat directly above a meal tray stowage position;
      (ii) a cross-member for being positioned laterally across the surface of the seat back and locked to the seat back by releasable connection to the pair of latch plates; and
      (iii) a latch mounted on said cross-member and movable between a retracted position for permitting the meal tray to be moved into and out of its stowage position and an extended position for latching the meal tray to the surface of the seat back.

9. A passenger seat according to claim 8, and including a pair of pins cooperating with respective latch plates and said cross-member for retaining the cross member on the seat back.

10. A passenger seat according to claim 9, wherein said pair of pins are carried by said cross-member and include springs for maintaining said pins in a normally extended locking position with the cross-member locked to the latch plates.

11. A passenger seat according to claim 8, wherein said cross-member is adapted for being positioned on said seat back over a dress cover.

12. A passenger seat according to claim 8, wherein said cross-member includes a recess in an outer surface thereof, and wherein said latch is positioned within in said recess.

13. A passenger seat according to claim 8, wherein said latch comprises a rotatable latching member mounted for rotation on a pin positioned adjacent one end thereof and mounted to said cross-member, the extended position of said latch being with said latching member extending downwardly from the cross-member into interfering relation with a top edge of the meal tray and the retracted position being with said latching member extending laterally to one side of the pin in non-interfering relation with the top edge of the meal tray.

14. A passenger seat, comprising:
   (a) a ladder frame assembly including a leg for being attached to a supporting surface;
   (b) a seat bottom assembly carried by the ladder frame assembly;
   (c) a seat back carried by the ladder frame assembly, and including a dress cover for covering seat back cushion assembly and seat back frame portions of the seat back;
   (d) a meal tray carried the ladder frame assembly for being used by a passenger seated aft of the passenger seat; and
   (e) a meal tray latch assembly, comprising:
      (i) a pair of laterally spaced-apart latch plates for being secured to a surface of a seat back of a passenger seat directly above a meal tray stowage position;
      (ii) a cross-member for being positioned laterally across the surface of the seat back and locked to the seat back by releasable connection to the pair of latch plates; and
      (iii) a latch mounted on said cross-member and movable between a retracted position for permitting the meal tray to be moved into and out of its stowage position and an extended position for latching the meal tray to the surface of the seat back.

15. A passenger seat according to claim 14, and including a pair of pins cooperating with respective latch plates and said cross-member for retaining the cross member on the seat back.

16. A passenger seat according to claim 15, wherein said pair of pins are carried by said cross-member and include springs for maintaining said pins in a normally extended locking position with the cross-member locked to the latch plates.

17. A passenger seat according to claim 16, wherein said latch plates include laterally-inwardly facing latching ports for receiving the pins.

\* \* \* \* \*

UNITED STATES PATENT AND TRADEMARK OFFICE
CERTIFICATE OF CORRECTION

PATENT NO. : 6,550,861 B1 Page 1 of 1
DATED : April 22, 2003
INVENTOR(S) : Williamson, John It is certified that error appears in the above-identified patent and that said Letters Patent is hereby corrected as shown below:

<u>Column 9,</u>
Line 4, after "within" delete "in".

<u>Column 10,</u>
Line 6, after "within" delete "in".

Signed and Sealed this

Twenty-fifth Day of November, 2003

JAMES E. ROGAN
*Director of the United States Patent and Trademark Office*